A. D. BRIXEY.
MOVING PICTURE FILM AND METHOD OF MAKING.
APPLICATION FILED FEB. 3, 1915. RENEWED MAY 14, 1918.
1,270,778.
Patented July 2, 1918.
2 SHEETS—SHEET 1.
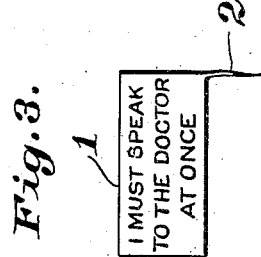
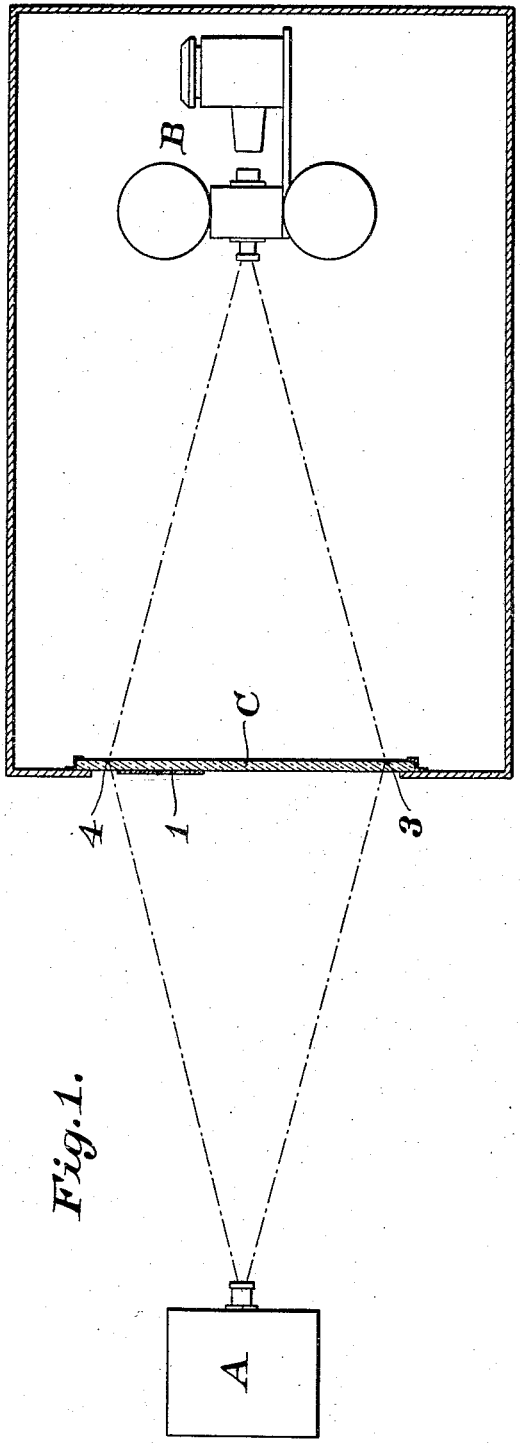
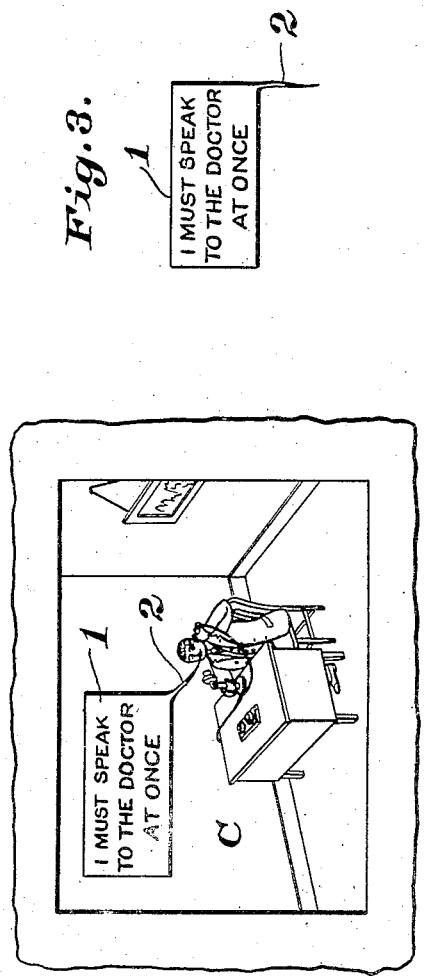

UNITED STATES PATENT OFFICE.

AUSTIN D. BRIXEY, OF NEW YORK, N. Y.

MOVING-PICTURE FILM AND METHOD OF MAKING.

1,270,778.  Specification of Letters Patent.  Patented July 2, 1918.

Application filed February 3, 1915, Serial No. 5,312. Renewed May 14, 1918. Serial No. 234,536.

*To all whom it may concern:*

Be it known that I, AUSTIN D. BRIXEY, a citizen of the United States, and resident of New York, in the county of New York and State of New York, have invented certain new and useful Improvements in Moving-Picture Films and Methods of Making, of which the following is a specification.

This invention relates to films bearing pictures, taken at suitable intervals of moving objects, so that when the film is passed through a kinetoscope at suitable speed in the usual way, the successive pictures projected on the screen give the appearance of moving objects.

In order that such pictures may be understood, it has heretofore been necessary to interrupt the pictures in order that an explanatory dialogue or description could be inserted.

It is an object of the present invention to supply such information without interrupting the picture exhibition and concurrently with the showing of the pictures. This is accomplished by making an inscription or inscriptions upon the picture film in association with the object or objects to which it relates. For instance, if a person in the moving picture is supposed to be saying something, an inscription to that effect is placed upon the film in association with that person, so that the moving person and what he is supposed to be saying are conjointly exhibited to the observer, thereby making the actions much more intelligible and entertaining and in many cases giving reason to actions which would otherwise be meaningless. Similarly, an inscription might be associated with an inanimate object. For instance, the expression "Ting-a-ling-a-ling" might be associated with a bell to indicate that it was ringing and so on.

It is a further object of the invention to provide a method whereby the inscription may be readily and accurately placed upon the films.

Other and ancillary objects of the invention will appear hereinafter.

In the accompanying drawings which illustrate the invention,

Figure 1. is an elevation of apparatus for producing the film with the desired inscription;

Fig. 2. is an elevation of the picture screen of Fig. 1. showing a picture thereon with an inscription applied, Fig. 3. shows a device bearing the inscription to be applied to a film.

Figure 4:
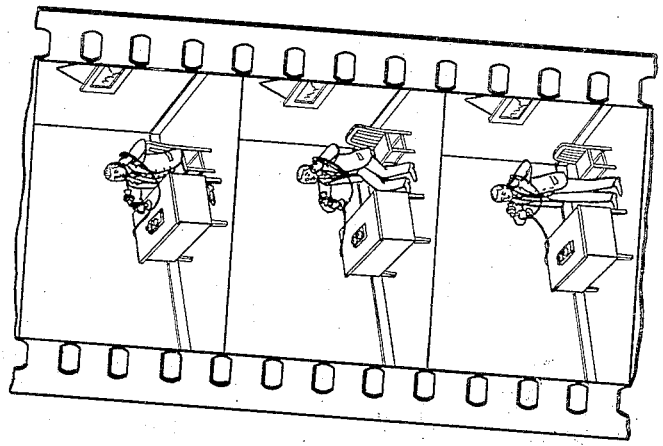

Fig. 4. is a portion of a film before an inscription is applied and

Figure 5:
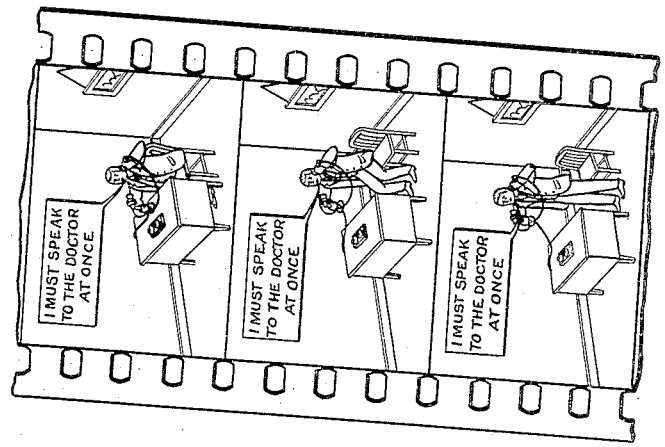

Fig. 5. is a film bearing an inscription.

Referring to the drawings, A is a camera; B is a kinetoscope or moving picture projector, and C is a picture screen upon which the pictures are projected by the projector B. Preferably the projector is in a closed compartment back of the screen C, so that no fugitive light rays will interfere with the projection. The inscription which it is desired to place upon the film is applied to the screen C. The picture projected on the screen therein by the projector B has the inscription imposed upon it and a picture of the whole is taken by the camera A on a suitable film which will then show a picture with the inscription upon it.

The projector B may be of any well known or suitable type adapted to utilize a film having upon it successive pictures of moving objects so that when passed through the projector at any suitable speed a reproduction of the objects and their motion is obtained upon the picture screen.

The picture screen C in the apparatus illustrated is a translucent screen of some suitable substance, such as paper, ground glass or other translucent substance, but preferably it is a screen as described in my application, Serial No. 792,570, filed Sept. 30th, 1913.

The camera A is of any well known or suitable form adapted to use a film for taking successive pictures of objects in the manner well known in connection with the production of moving picture films.

The inscription is superimposed upon the picture by means of a placard 1., as shown for instance, in Fig. 3., which is secured upon the projection screen C by means of an adhesive or in any other suitable way.

In order that the description may, in the picture, be associated with the object to which it relates, an extensible and flexible line or leader 2 may be secured to the placard and the end of this leader moved as the pictures succeed each other, to connect the placard with the desired object. For instance, the inscription may be a sentence which is spoken by a person in the picture, and their relationship may be indicated by a leader from the inscription to the mouth of the speaker, as is illustrated in the picture of Fig. 2, which shows a man speaking into a telephone and saying "I must speak to the doctor at once." The extensibility and flexibility of the leader 2 permits its end, under such circumstances, to be placed adjacent to the mouth of the speaker in successive pictures (despite the movements of the person into different positions) for as long a period as is desired.

In producing the desired film by the apparatus referred to, a moving picture film carrying successive photographic pictures of moving objects and adapted to reproduce the same, taken in the usual way, is placed in operative position in the projector B. One of the pictures having been brought into the exhibiting position of the projector, it will be projected upon the screen C where it will be reproduced on an enlarged scale, the upper and lower limits being at 4 and 3. The picture on the film in the projector in this instance will be assumed to be a picture like that shown in Fig. 2, but with the inscription removed, the same representing a man sitting at a desk and talking into a telephone. Fig. 4, shows a portion of a film with successive pictures indicating the rising of the man from a sitting to a standing position.

The picture having been thrown on the screen as described, the placard, as 1, may be imposed upon the picture at any suitable point by securing it upon the face of the screen and the end of the leader 2, be moved so as to be placed upon or adjacent to the mouth of the man. Of course, other means than such a leader might be employed for associating the inscription with the object to which it relates. It might be sufficient under many circumstances to simply place the inscription above or in other suitable relation to the object without any leader, the desired result being attained if the arrangement is such that the relation of the inscription and object is clear to the observer.

The picture having been thus projected upon the screen and the placard adjusted, a photograph is taken by the camera A which, when developed, will give a picture like that shown in Fig. 2, only of much smaller size, the camera reducing the picture from the size of the picture photographed. This facilitates the making of the inscription and its adjustment on the picture, the actual size of the picture on the film being very small.

One picture having been thus taken by the camera, the next succeeding picture on the film in the projector is moved into position and the film in the camera A is moved along one space. The picture in the projector is thrown upon the screen, the end of the leader from the placard is moved adjacent to the mouth of the man, in his new position, and another picture is taken by the camera A. This is repeated indefinitely, movement of the film in the projector, being accompanied by a corresponding movement in the camera A. A given placard is allowed to remain in place upon the camera during the taking of as many pictures as is desired so that in the final film its inscription shall appear during as great an interval of the exhibition as is thought advisable. As successive pictures are taken and different persons come into view or the conversation changes or for other reasons it is desirable, different placards may be applied to the screen at suitable locations and maintained in position as long as is necessary to impress them on the film for the desired period.

Fig. 4. shows a portion of a film bearing successive photographic pictures such as is obtained upon exposure to the moving objects, this film being of the usual character, without inscriptions, such as is employed in the projector B. Fig. 5. shows the same film except that the inscription has been added as has been described. The film with the inscriptions, as shown in Fig. 5, may be run through a projector in the usual way when the usual moving pictures will appear on the screen but with the inscriptions added which greatly enhance the ready understanding and enjoyment of the pictures.

The final inscribed film may be produced by running the entire film through the camera A, the inscription or inscriptions having been approximately added. The film thus passed through the camera will be a reproduction of the film run through the projector except for the addition of the inscription or inscriptions. Also, and this will probably prove most desirable where the number of inscribed pictures is small compared to the total, only those pictures of the film in the projector which are to be inscribed are reproduced, the final film being formed by cutting from the projector film sections bearing the pictures corresponding to the inscribed ones and inserting sections bearing the inscribed ones in their stead.

It will be understood that my moving picture film and the process of making the same may be varied in divers ways without departing from the invention which, therefore, is not limited to the structure shown in the drawings; neither is the method limited to practice with the apparatus shown in the drawings nor to all the details which have been described as incident to such practice.

What I claim as new and desire to secure by Letters Patent is:

1. The method of producing a moving-picture film which consists in successively photographing a moving object, projecting one or more of the pictures thus obtained upon a screen bearing an inscription, and photographing the projected picture or pictures and the inscription.

2. The method of producing a moving-picture film which consists in successively photographing a moving object, reproducing one or more of the pictures on an enlarged scale, adding an inscription to the enlargement or enlargements and photographing the enlargement or enlargements with the inscription associated therewith.

3. The method of producing a moving-picture film which consists in successively photographing a moving object, reproducing one or more of the pictures on an enlarged scale, adding an inscription to the enlargement or enlargements and photographing, on a reduced scale, the enlargement or enlargements with the inscription associated therewith.

4. The method of producing a moving-picture film which consists in successively photographing a moving object, projecting one or more of said pictures upon a screen bearing an inscription, the projected picture or pictures being on a larger scale than the photographs projected, and photographing on a reduced scale the picture or pictures on the screen in association with the inscription.

Signed at New York city, in the county of New York and State of New York, this 2nd day of February, A. D. 1915.

AUSTIN D. BRIXEY.

Witnesses:
MARY W. WALLACE,
A. H. ABELL.